Patented Dec. 15, 1942

2,305,327

UNITED STATES PATENT OFFICE 2,305,327

CERAMIC MATERIAL MADE OF MAGNESIUM TITANATE AND METHOD OF PREPARING THE SAME

Hans Thurnauer, Chattanooga, Tenn., assignor to American Lava Corporation, Chattanooga, Tenn., a corporation of Tennessee No Drawing. Application June 27, 1938, Serial No. 216,173

12 Claims. (Cl. 106—46)

This invention relates to electrical insulating material and to the method of producing the same.

The principal object of my invention is to provide electrical insulating material which has a comparatively high dielectric constant, a low power factor and low or negligible change of dielectric characteristics, particularly of dielectric constant, through a wide range of temperatures.

Another object of my invention is to provide an electrical insulating material having a low coefficient of thermal expansion.

Another object of my invention is to provide a novel process for utilizing powdered magnesium titanate in the formation of an electrical insulating material.

Another object of my invention is to provide a process for the production of magnesium titanate in powdered form, suitable for use in the formation of dielectric articles, said magnesium titanate permitting the subsequent vitrification of said articles through a wide range of temperatures commercially and economically obtainable.

Another object of my invention is to provide a method or process for producing a dielectric material of magnesium titanate wherein the vitrification of the magnesium titanate is obtained with negligible shrinkage during firing.

Still another object of my invention is to provide an electrical insulating material of magnesium titanate containing impurities present in the raw materials from which the magnesium titanate is produced, which impurities enhance, rather than detract from, the dielectric properties of the insulating material.

Further objects will hereinafter appear in the detailed description of my invention and be particularly pointed out in the appended claims.

The rapidly growing use of short and ultrashort waves in radio communication has confronted the manufacturer of electrical insulators with the necessity of developing insulating materials for use as dielectrics in condensers which will have low dielectric losses at such high frequencies. In addition, such materials should have high dielectric constants because of the limited space available in most electronic devices, necessitating a condenser of concentrated capacity and must exhibit negligible changes in both physical and electrical properties with increase in temperature in order to maintain constancy of capacity over a wide temperature range.

Since a condenser forms part of an oscillating circuit, it is also desirable in some cases that the electrical characteristics of such a condenser change in predetermined directions and with predetermined magnitude with changing temperature in order to counterbalance electrical changes with temperature of other parts of the oscillating circuit. The constancy of frequency of the total oscillating circuit is thus maintained over a wide temperature range.

Various ceramic materials have been proposed for this purpose and subjected to tests to determine their relative merits. Of the materials tested, bodies consisting principally of magnesium oxide and titanium dioxide, and particularly magnesium titanate of various molecular formulae, exhibit the characteristics most desirable in dielectrics of radio condensers. Magnesium titanate has an extremely low power factor, a high dielectric constant, a low coefficient of thermal expansion, and a low or negligible change of dielectric properties, particularly of dielectric constant between room temperature and 100 degrees centigrade, the highest temperature which a radio condenser normally attains.

In the past, vitrified ceramic articles containing magnesium oxide and titanium dioxide in various proportions have been prepared by thoroughly mixing magnesium compounds, such as magnesium oxide, magnesium carbonate and magnesium hydroxide with titanium compounds such as natural rutile and precipitated or calcined titanium dioxide. Suitable organic or inorganic binders and fluxes were then added to the mixture to enable the ceramic material to be formed into the desired shapes and vitrified and the articles so formed were fired to vitrification at high temperatures. However, it is very difficult to obtain a satisfactory product which is completely vitrified by this method. The temperatures at which magnesium oxide and titanium dioxide react to form magnesium titanate are very high and in close proximity to the eutectic melting points of the oxide mixture. Consequently, the vitrification temperatures and melting points of such ceramic mixtures are almost the same, making it extremely difficult to fire them commercially. The addition of fluxes lowers the firing temperatures to some extent but does not widen the firing range sufficiently to include temperatures commercially practicable. Moreover, very high shrinkage and warping is experienced during the firing because of the flowing of the material at temperatures near its melting point, rendering it almost impossible to obtain vitrified articles and extremely difficult to hold such articles to as close dimensions as are necessary for mass production work.

My invention relates to a novel method or process for the preparation of magnesium titanate ceramics by which the difficulties heretofore encountered are avoided. In its preferred embodiment, magnesium oxide and titanium dioxide in various proportions, but preferably corresponding to their molecular ratios in magnesium titanate, are thoroughly mixed and ground into a fine powder. The titanium dioxide need not necessarily be pure but may contain some of the impurities present in natural rutile from which it is usually obtained. A mixture containing the latter form of titanium dioxide of the following chemical composition has been found to exhibit excellent electrical properties:

| | Per cent |
|---|---|
| $TiO_2$ | 60.0 |
| $SiO_2$ | 3.0 |
| $CaO$ | .3 |
| $MgO$ | 36.0 |
| $Fe_2O_3$ | .1 |
| $Na_2O$ | .3 |
| $Al_2O_3$ | .3 |
| $P_2O_5$ | .15 |
| | 100.15 |

From this analysis, it is apparent that impurities such as ferric oxide, aluminum oxide and phosphorus pentoxide may be present in small amounts and actually improve the characteristics of the final product. If desired, such impurities may be introduced into the mixture of magnesium oxide and titanium dioxide when not present in the form of titanium dioxide readily obtainable.

The oxide mixture is introduced into a kiln in either powdered or briquet form and sintered at the temperature at which magnesium oxide and titanium dioxide react to form magnesium titanate. The phase diagram of magnesium oxide and titanium dioxide indicates that the system has three eutectic melting points at the following molecular percentages:

1. 18% of MgO, 82% of $TiO_2$ at 1640 degrees centigrade,
2. 46% of MgO, 54% of $TiO_2$ at 1610 degrees centigrade,
3. 78% of MgO, 22% of $TiO_2$ at 1800 degrees centigrate.

As the temperatures of reaction of this mixture closely approach its melting point the sintering temperature depends upon its composition.

After the mixture has been sintered, it is cooled down and the sintered mass then disintegrated into a powder sufficiently fine to pass at least a 150 mesh screen to facilitate the preparation of a ceramic body. To this powder, which consists principally of magnesium titanate but may contain some magnesium and titanium as free oxides, organic binders such as dextrin and flour paste are added to give the powder sufficient plasticity to enable it to be formed into the desired shapes. Moreover, it is possible to add excess of titanium dioxide to the body without materially changing the vitrification range or firing temperature of the body. Since titanium dioxide has a negative temperature coefficient of capacity, by the addition of titanium dioxide to the powdered magnesium titanate it is possible to obtain bodies with predetermined negative temperature coefficient of capacity, depending upon the amount of titanium dioxide added to the batch.

The presence of both crystalline and glassy phases of matter in a vitrified ceramic body materially increases its power factor, rendering it unsuitable as a high frequency insulator. In order to obtain a homogeneous body, it is necessary to add certain substances to the ceramic material which act as mineralizers and convert the glassy matter into its crystalline phase during the firing by which vitrification is obtained. Accordingly, very important further additions to the magnesium titanate powder are small amounts of mineralizers. Titanates, which have lower melting points than the sintered mass, are especially suitable for this purpose. Oxides such as lead oxide and calcium oxide or other substances such as clay, calcium carbonate, calcium phosphate and lead silicate can be used. However, the most efficient mineralizer has been found to be lead titanate of the formula $PbOTiO_2$ added to the powder in quantities between one-fourth (¼) per cent and ten (10) per cent of the total mixture, preferably between one-third (⅓) per cent and three (3) per cent, the amount varying with the chemical composition of the powder.

After the mineralizers and binders have been added to and mixed with the powder, the resulting ceramic batch is formed into the desired shapes according to known ceramic methods, such as dry pressing, extrusion, and casting. Although not a requisite, it is desirable to form the batch under a pressure of at least two thousand (2,000) pounds per square inch as the application of such pressure adds materially to the effectiveness of the final firing.

The ceramic bodies so formed are placed in a kiln and the recrystallization and vitrification carried out at firing temperatures between Seger cones 10 and 14, the temperature required being practically independent of the chemical composition of the bodies. As was the sintering, this firing is under oxidizing conditions and preferably in electric kilns in which a uniform atmosphere throughout the kiln can be obtained. At these comparatively low firing temperatures a completely vitrified material having excellent dielectric properties is obtained.

An example of a ceramic material fired to Seger cone 13 is the following:

| | Per cent |
|---|---|
| Sintered mass (consisting of $TiO_2$ 60%, MgO 36%, impurities 4%) | 96 |
| Lead titanate | 1 |
| Dextrin | 3 |
| | 100 |

By preparing vitrified bodies according to the above process, it is apparent that the obstacles which have heretofore curtailed the commercial production and use of magnesium titanate as an electrical insulating material have been surmounted. The wide range of vitrification temperatures includes temperatures economically obtainable. As these temperatures are considerably below the melting point of a magnesium titanate mixture shrinkage and warping during firing are reduced to an almost negligible amount, making it possible to obtain commercial pieces accurate to size and of a uniformity hitherto unknown for such products.

From the detailed description hereinabove set forth it can be seen that I have invented a novel method or process for producing an electrical insulating material having excellent dielectric and physical properties which is particularly suited for high frequency applications. The disclosure is merely an exemplification of my invention and is not intended to limit its scope to the particular embodiment but to include all such changes as do not constitute a departure from the scope of the invention.

Having now described my invention, what I claim and desire to secure by Letters Patent is:

1. The method of producing electrical insulating material of magnesium titanate which comprises sintering a mixture of magnesium oxide and titanium dioxide, reducing the sintered product to a powder, forming the powder into a predetermined shape, and finally firing the shape so formed to vitrify the same.

2. The method of producing electrical insulating material containing magnesium titanate from magnesium oxide and titanium dioxide, which comprises mixing the oxides, sintering the oxide mixture, grinding the sintered mass into a powder, forming the powder into a body of any desired shape, and subsequently firing the body to vitrify the same.

3. The method of producing electrical insulating material of magnesium titanate which comprises sintering a mixture of magnesium oxide and titanium dioxide, grinding the sintered mass into a powder, adding thereto binders and mineralizers, forming the product into a body of any desired shape, and subsequently firing the same to crystallize the body so formed.

4. The method of producing electrical insulating material containing magnesium titanate from magnesium oxide and titanium dioxide, which comprises mixing the oxides, sintering the oxide mixture, reducing the sintered mass into a powder, adding to the powder organic binders and mineralizers, forming the product into a ceramic body under a pressure of at least two thousand pounds per square inch, and subsequently firing the same to crystallize and vitrify the body so formed.

5. The method of producing a vitrified ceramic body, which comprises sintering a mixture of magnesium oxide and titanium dioxide at the temperature at which the oxides react to produce magnesium titanate, grinding the sintered mass into a powder, forming the powder into a body of any desired shape, and subsequently firing the same at a temperature lower than the sintering temperature to vitrify the body so formed.

6. The method of producing a vitrified ceramic body, which comprises sintering a mixture of magnesium oxide and titanium dioxide at the temperature at which the oxides react to produce magnesium titanate, grinding the sintered mass into a powder, adding thereto mineralizers and organic binders, forming the powder into a predetermined shape, and subsequently firing the shape so formed at a temperature between Seger cones 10 and 14 to crystallize the same.

7. The method of producing an electrical insulating material containing magnesium titanate which comprises sintering a mixture of magnesium oxide and titanium dioxide, reducing the sintered mass to a powder, adding thereto organic binders and lead titanate, forming the product into a ceramic body under a pressure of at least two thousand pounds per square inch, and subsequently firing the body so formed at a temperature between Seger cones 11 and 14 to crystallize the same.

8. The method of producing electrical insulating material of magnesium titanate and titanium dioxide which comprises sintering a mixture of magnesium oxide and titanium dioxide, reducing the sintered product to a powder, adding thereto titanium dioxide, binders and mineralizers, forming the product into a body of any desired shape and subsequently firing the same to crystallize the body so formed.

9. The method of producing electrical insulating material of magnesium titanate and titanium dioxide, which comprises mixing the oxides of magnesium and titanium, sintering the oxide mixture, reducing the sintered mass into a powder, adding to the powder titanium dioxide, organic binders and mineralizers, forming the product into a ceramic body under a pressure of at least two thousand pounds per square inch, and subsequently firing the same to crystallize and vitrify the body so formed.

10. The method of producing a vitrified ceramic body, which comprises sintering a mixture of magnesium oxide and titanium dioxide at the temperature at which the oxides react to produce magnesium titanate, grinding the sintered mass into a powder, adding thereto titanium dioxide, forming the product into a body of any desired shape, and subsequently firing the same at a temperature lower than the sintering temperature to vitrify the body so formed.

11. The method of producing a vitrified ceramic body, which comprises sintering a mixture of magnesium oxide and titanium dioxide at the temperature at which the oxides react to produce magnesium titanate, grinding the sintered mass into a powder, adding thereto titanium dioxide, mineralizers and organic binders, forming the product into a predetermined shape, and subsequently firing the shape so formed at a temperature between Seger cones 10 and 14 to crystallize the same.

12. The method of producing an electrical insulating material, which comprises sintering a mixture of magnesium oxide and titanium dioxide, reducing the sintered mass to a powder, adding thereto titanium dioxide, organic binders and lead titanate, forming the product into a ceramic body under a pressure of at least two thousand pounds per square inch, and subsequently firing the body so formed at a temperature between Seger cones 11 and 14 to crystallize the same.

HANS THURNAUER.